United States Patent Office 3,407,255
Patented Oct. 22, 1968

3,407,255
17α-ETHYNYL-13β-n-PROPYL-Δ$^{5(10)}$-GONENE-17β-ol-3-ONE, ITS ESTERS AND USE
Robert Joly, Montmorency, Val-d-'Oise, and Julien Warnant, Neuilly-sur-Seine, France, assignors to Roussel—UCLAF, S.A., Paris, France, a corporation of France
No Drawing. Continuation-in-part of application Ser. No. 273,295, Apr. 16, 1963. This application July 27, 1964, Ser. No. 385,503
2 Claims. (Cl. 424—243)

ABSTRACT OF THE DISCLOSURE

The present invention relates to the use of 17α-ethynyl-13β-n-propyl-Δ$^{5(10)}$-gonene-17β-ol-3-one and esters thereof with organic carboxylic acids having from 1 to 18 carbon atoms corresponding to the following Formula I:

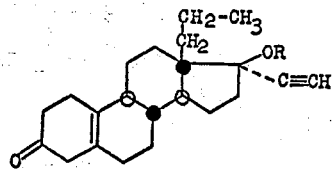

wherein R represents a member selected from the group consisting of hydrogen and the acyl radical of an organic carboxylic acid having from 1 to 18 carbon atoms, as a medicine for its progestomimetic action.

This application is a continuation-in-part of our co-pending, commonly assigned application, United States patent application Ser. No. 273,295, filed Apr. 16, 1963, now abandoned.

17α - ethynyl - 13β-n-propyl-Δ$^{5(10)}$-gonene-17β-ol-3-one and its esters with organic carboxylic acids having from 1 to 18 carbon atoms have a steric configuration which corresponds to that of natural steroid products and are possessed of useful physiological properties. They have, in particular, a remarkable progestomimetic action, coupled with a weak hypophysial inhibitory action against the over-secretion of folliculo-stimulating gonadotropic hormones (F.S.H. factory) and practically non-existent estrogenic activity.

The invention has for its object the development of gonene compounds of the formula

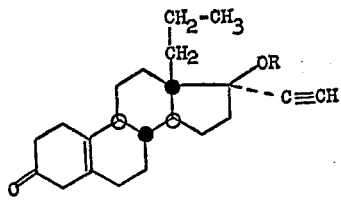

wherein R represents a member selected from the group consisting of hydrogen and the acyl radical of an organic carboxylic acid having from 1 to 18 carbon atoms, and particularly 17α - ethynyl-13β-n-propyl-Δ$^{5(10)}$-gonene 17β-ol-3-one.

A further object of the invention is the process of obtaining a progestomimetic response in warm-blooded animals which comprises administering from about 1 mg./kg. to about 15 mg./kg. per day of the gonene compound of the formula

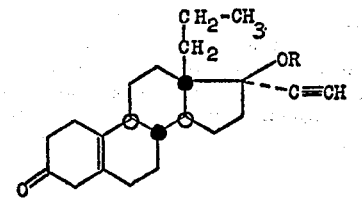

wherein R represents a member selected from the group consisting of hydrogen and the acyl radical of an organic carboxylic acid having from 1 to 18 carbon atoms, and particularly 17α - ethynyl-13β-n-propyl-Δ$^{5(10)}$-gonene-17β-ol-3-one.

These and other objects of the invention will become more apparent as the description thereof proceeds.

It has now been found that gonene compounds of the formula

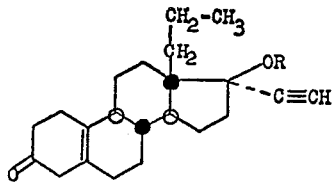

wherein R represents a member selected from the group consisting of hydrogen and the acyl radical of an organic carboxylic acid having from 1 to 18 carbon atoms, and particularly 17α - ethynyl-13β-n-propyl-Δ$^{5(10)}$-gonene-17β-ol-3-one, are new and novel steroid products possessed of interesting physiological properties.

17α - ethynyl - 13β-n-propyl-Δ$^{5(10)}$-gonene-17β-ol-3-one occurs in the form of a colorless solid compound, crystallized in quadrangular prisms and soluble in alcohol, ether, acetone, benzene and chloroform and insoluble in water.

Its melting point determined on the Kofler block is 172° C. and its specific rotation [α]$_D^{20}$=+91° (c.=0.4% in methanol).

Infrared spectra shows the presence of a hydroxyl band, the presence of an ethynyl group, and the presence of a band at 1715 cm.$^{-1}$ corresponding to a non-conjugated ketone.

17α - ethynyl-13β-n-propyl-Δ$^{5(10)}$-gonene-17β-ol-3-one is prepared as shown in United States Patent No. 3,136,790. The principle of preparation consists in that 17α-ethynyl-13β-n-propyl-Δ$^{4,9}$-gonadiene-17β-ol-3-one is subjected to the action of a metal selected from the group consisting of alkali metals and calcium in the presence of liquid ammonia and a proton donor. The most advantageous metal is lithium. In the process, unexpectedly, the acetylenic bond is not affected.

The reaction occurs at temperatures between about −30° C. and −80° C., preferably between about −60° C. and −70° C. As proton donors, it is preferable to utilize lower alkanols such as methanol and ethanol which also have a solvent effect. The reaction can be conducted in the presence or absence of another solvent inert to the action of the metals employed, preferably the lower alkyl ethers such as ethyl or isopropyl ether or the cycloalkyl ethers such as dioxane and tetrahydrofuran.

The reaction scheme follows the following flow diagram:

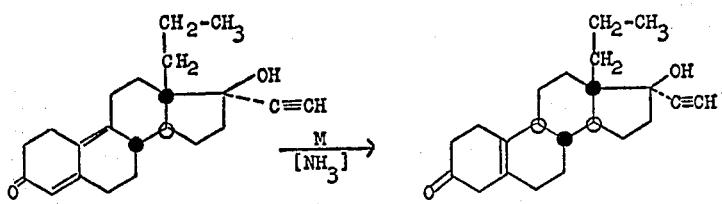

M represents an alkali metal or calcium.

17α-ethynyl-13β-n-propyl - $\Delta^{4,9}$ - gonadiene-17β-ol-3-one, the starting compound, was prepared according to the method described in copending, commonly assigned United States patent application Ser. No. 204,057, filed June 21, 1962.

The product thus obtained is identical to the product obtained according to the first process described above. 3-methoxy-17α-ethynyl-13β-n-propyl - $\Delta^{2,5(10)}$ - gonadiene-17β-ol is obtained starting from 13β-n-propyl-nor-estradiol described by Velluz et al., Tetrahedron Letters No. 3, pp. 127–130 (1961). The following flow diagram shows the passage of 13β-n-propyl-nor-estradiol to 3-methoxy-17α-ethynyl - 13β - n-propyl - $\Delta^{2,5(10)}$ - gonadiene-17β-ol, then to the final 17α-ethynyl-13β-n-propyl-$\Delta^{5(10)}$-gonene-17β-ol-3-one (I, R=H).

TABLE I

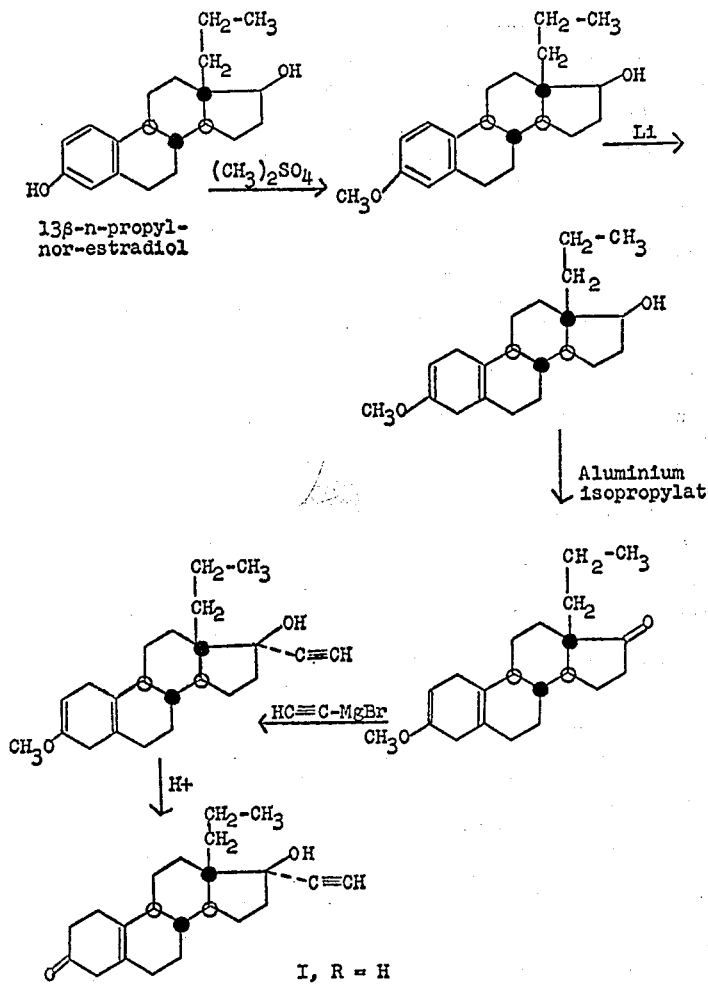

17α-ethynyl-13β-n-propyl - $\Delta^{5(10)}$ - gonene-17β-ol-3-one (I, R=H) can also be prepared by acid hydrolysis of 3-methoxy-17α-ethynyl-13β-n-propyl - $\Delta^{2,5(10)}$ - gonadiene-17β-ol. This hydrolysis is effected preferably with aqueous acetic acid at ordinary temperatures. By the addition of water, 17α-ethyl-13β-n-propyl-$\Delta^{5(10)}$-gonene-17β-ol-3-one precipitates. The compound is purified by recrystallization from isopropyl ether by heating and cooling.

When desired, 17α-ethynyl-13β-n-propyl-$\Delta^{5(10)}$-gonene-17β-ol-3-one can be esterified by the action of a functional derivative, such as the acid chloride or acid anhydride, of an organic carboxylic acid having from 1 to 18 carbon atoms.

The organic carboxylic acids having from 1 to 18 carbon atoms are those of aliphatic or cycloaliphatic, saturated or unsaturated carboxylic acids or those of aromatic or heterocyclic carboxylic acids: For example, alkanoic acids, such as formic acid, acetic acid, propionic acid, butyric acid, isobutyric acid, valeric acid, isovaleric acid, trimethylacetic acid, caproic acid, β-trimethylpropionic acid, oenanthic acid, caprylic acid, pelargonic acid, capric acid, undecylic acid, lauric acid, myristic acid, palmitic acid, stearic acid; alkenoic acids, such as undecylenic acid, oleic acid; cycloalkanoic acids, such as cyclopentylcarboxylic acid, cyclopropyl-carboxylic acid, cylobutyl-carboxylic acid, cyclohexyl-carboxylic acid; cycloalkyl-alkanoic acids, such as cyclopropylmethyl-carboxylic acid, cyclobutylmethyl-carboxylic acid, cyclopentylethyl-carboxlic acids, cyclohexylethyl-carboxylic acid; arylalkanoic acids, such as phenylacetic acid, phenylpropionic acid; benzoic acid; phenoxyalkanoic acids, such as phenoxyacetic acid, p-chlorophenoxyacetic acid, 2,4-dichlorophenoxyacetic acid, 4-t.-butylphenoxyacetic acid, 3-phenoxypropionic acid, 4-phenoxybutyric acid; heterocyclic-carboxylic acids, such as furane-2-carboxylic acid, 5-t.-butyl-furane-2-carboxylic acid, 5-bromofurane-2-carboxylic acid, nicotinic acid; β-ketocarboxylic acids, such as acetylacetic acid, propionylacetic acid, butyrylacetic acid; aminoacids, such as diethylaminoacetic acid, aspartic acid, etc.

The following examples are illustrative of the invention. They are not, however, to be construed as limitative. It is obvious that other expedients known to the art may be employed.

EXAMPLE I

Preparation of 17α-ethynyl-13β-n-propyl-$\Delta^{5(10)}$-gonene-17β-ol-3-one (I, R=H) by reduction of the corresponding $\Delta^{4,9}$-steroid 10-gm. of 17α-ethynyl-13β-n-propyl-$\Delta^{4,9}$-gonadiene-17β-ol-3-one were dissolved in a mixture of 50 cc. of methanol and 140 cc. of anhydrous tetrahydrofuran under an atmosphere of nitrogen. The solution obtained was cooled to −70° C. 140 cc. of liquid ammonia were added. Then, over a space of ten minutes, about 535 mg. of finely pulverized lithium were introduced. The mixture was subjected to agitation under cooling towards −70° C. for a period of about ten minutes. Next, the reaction mixture was poured into a mixture of water and ice. The mixture was agitated for a period of about two hours. The precipitate formed was vacuum filtered, washed with water until the wash waters were neutral, and dried. 9.657 gm. of raw 17α-ethynyl-13β-n-propyl-$\Delta^{5(10)}$-gonene-17β-ol-3-one were obtained. The product was purified by recrystallization from isopropyl ether. The purified product had a melting point 172° C. and a specific rotation $[\alpha]_D^{20} = +91°$ (c.=0.4% in methanol).

The product was soluble in alcohol, ether, acetone, benzene and chloroform and insoluble in water.

This compound was not described in the literature prior to our invention.

17α-ethynyl-13β-n-propyl-$\Delta^{4,9}$-gonadiene-17β-ol-3-one, the starting compound, was prepared according to the method described in United States patent application Ser. No. 204,057, filed June 21, 1962.

EXAMPLE II

Preparation of 17α-ethynyl-13β-n-propyl-$\Delta^{5(10)}$-gonene-17β-ol-3-one

Step A: Preparation of 3-methoxy-13β-n-propyl-$\Delta^{1,3,5(10)}$-gonatriene-17β-ol.—A suspension of 17 gm. of 13β-n-propyl-18-nor-estradiol in 85 cc. of acetone, dissolved by addition of 43 cc. of 1.95 N sodium hydroxide solution, was agitated at 20° C. for a period of 5 minutes under nitrogen. The reaction mixture was heated to reflux and 7 cc. of dimethyl sulfate were introduced into the solution. The solution was allowed to remain at reflux for a period of an hour and a half and during this time, in two lots, 28 cc. of sodium hydroxide solution, then 4 cc. of dimethyl sulfate were introduced.

The solution was cooled to 15° C. Water was added thereto. The solution was filtered. The precipitate was vacuum filtered and washed until neutral.

17.850 gm. of 3-methoxy-13β-n-propyl-$\Delta^{1,3,5(10)}$-gonatriene-17β-ol were recovered having a melting point of 103–104° C. and a specific rotation $[\alpha]_D^{20} = +62.3°$ (c.=0.25% in ethanol).

This compound was not described in the literature prior to our invention.

Step B: Preparation of 3-methoxy-13β-n-propyl-$\Delta^{2,5(10)}$-gonadiene-17β-ol.—17.2 gm. of the product obtained in Step A were dissolved in 140 cc. of tetrahydrofuran. The solution was cooled to −35° C. and 172 cc. of liquid ammonia were introduced. Then slowly 2.7 gm. of lithium were added. The solution was maintained under agitation for a period of 18 minutes and the ammonia was allowed to evaporate.

The mixture was precipitated with water. The precipitate was separated, washed with water, vacuum filtered and dried. 22.5 gm. of 3-methoxy-13β-n-propyl-$\Delta^{2,5(10)}$-gonadiene-17β-ol were recovered having a melting point of 120–125° C.

This compound was not described in the literature prior to our invention.

Step C: Preparation of 3-methoxy-13β-n-propyl-$\Delta^{2,5(10)}$-gonadiene-17-one.—22.5 gm. of the compound obtained according to Step B were dissolved in 255 cc. of toluene under nitrogen and while agitating. The solution was concentrated and heated to 100° C. 374 cc. of methylethyl ketone and 260 cc. of toluene containing 6.8 gm. of aluminum isopropylate were introduced into the solution in the space of 4 hours. The refluxing was continued for a period of 15 minutes while distilling. Then the mixture was cooled to 20° C. 10 cc. of water were introduced into the reaction mixture under agitation. The precipitate of alumina was filtered and washed twice with 20 cc. of toluene each time. The toluene wash liquors were added to the reaction mixture. Then the toluene was removed from the reaction mixture by entrainment with water vapor. Water was introduced into the suspension obtained. The precipitate was vacuum filtered, washed and dried under vacuum.

17.5 gm. of 3-methoxy-13β-n-propyl-$\Delta^{2,5(10)}$-gonadiene-17-one were recovered having a melting point of 117–118° C.

An analytical sample showed a melting point of 122° C. and a specific rotation of $[\alpha]_D^{20} = +161°$ (c.=0.25% in ethanol).

Step D: Preparation of 3-methoxy-13β-n-propyl-17α-ethynyl-$\Delta^{2,5(10)}$-gonadiene-17β-ol.—5.9 gm. of a product obtained according to Step C were introduced at 30° C. into a solution of ethynyl magnesium bromide in tetrahydrofuran. The reaction mixture was heated to reflux while bubbling acetylene therethrough for a period of 2 hours. Next, the reaction mixture was cooled to +5° C. A suspension was obtained which was poured into ice water containing 360 gm. of ammonium chloride. The precipitate was separated, vacuum filtered, washed and dried under vacuum. 6.470 gm. of 3-methoxy-13β-n-propyl-17α-ethynyl-$\Delta^{2,5(10)}$-gonadiene-17β-ol were recovered having a melting point of 125–127° C. After recrystallization, an analytical sample showed a melting point of 140° C.

This compound was not described in the literature prior to our invention.

Step E: Preparation of 17α-ethynyl-13β-n-propyl-$\Delta^{5(10)}$-gonadiene-17β-ol-3-one.—1.6 gm. of the product obtained according to Step D were dissolved in 24 cc. of a 75% acetic acid solution. After total dissolution, the product crystallized. The suspension was maintained at 20° C. under agitation for a period of 15 minutes. Then it was poured into 120 cc. of water. The precipitate was separated, vacuum filtered, washed and dried under vacuum.

1.530 gm. of raw 17α-ethynyl-13β-n-propyl-$\Delta^{5(10)}$-gonene-17β-ol-3-one were obtained which product was purified by recrystallization. The purified product had an instantaneous melting point of 172° C. and a specific rotation of $[\alpha]_D^{20} = +91°$ (c.=0.4% in methanol).

The product occurred in the form of a colorless, solid compound, crystallized in quadrangular prisms, and was soluble in alcohol, ether, acetone, benzene and chloroform and insoluble in water.

Infrared spectra showed the presence of a hydroxyl band, the presence of an ethynyl group, and the presence of a band at 1715 cm.$^{-1}$ corresponding to a non-conjugated ketone.

This compound was not described in the literature prior to our invention.

As previously stated, esters and the free alcohol of 17α-ethynyl - 13β - n-propyl-$\Delta^{5(10)}$-gonene-17β-ol-3-one I, are possessed of interesting pharmacological properties. They possess particularly an important progestomimetic action while being practically devoid of estrogenic activity.

The product can be utilized in therapy in warm-blooded animals where a progestomimetic action, free from adverse side effects, is desirable.

17α - ethynyl - 13β-n-propyl-$\Delta^{5(10)}$-gonene-17β-ol-3-one and its esters are utilized orally, perlingually, transcutaneously and rectally.

They can be prepared in the form of injectable solutions or suspensions, prepared in ampules or in multiple-dose flacons, in the form of implants, tablets and suppositories.

The useful dosology is controlled between 1 mg./kg. and 15 mg./kg. per dose and per day in the warm-blooded animal as a function of the method of administration. The pharmaceutical forms such as injectable solutes and suspensions, tablets, glossettes or suppositories are prepared according to the usual processes.

EXAMPLE III

Pharmacological study of 17α-ethynyl-13β-n-propyl-$\Delta^{5(10)}$-gonene-17β-ol-3-one (a) Determination of the progestomimetic action.—The progestomimetic action of 17α-ethynyl-13β-n-propyl-$\Delta^{5(10)}$-gonene-17β-ol-3-one was determined by the Clauberg test effected on rabbits previously sensitized by the administration of folliculine. The medicine was administered orally at doses of 4 mg. per day for a period of 5 days. The animals were sacrificed on the 6th day and autopsied. They presented at the autopsy the characteristic lacy proliferation of the endometrium. All the rabbits thus treated presented such a structure, very well developed.

Comparable activity according to the above test was determined between 17α - ethynyl - 13β - n-propyl-$\Delta^{5(10)}$-gonene-17β-ol-3-one and both 17α-ethynyl-19-nor-testosterone and its $\Delta^{5(10)}$ isomer, 17α-ethynyl-$\Delta^{5(10)}$-estrene-17β-ol-3-one. Under oral administration of the three compounds the following ratio of activities was observed:

Table II.—Progestomimetic action—Clauberg test—
Oral administration

| | Activity ratio |
|---|---|
| 17α-ethynyl-13β-n-propyl-$\Delta^{5(10)}$-gonene 17β-ol-3-one | 2 |
| 17α-ethynyl-19-nor-testosterone | 1 |
| 17α-ethynyl-$\Delta^{5(10)}$-estrene-17β-ol-3-one | About 0 |

17α - ethynyl - 13β-n-propyl-$\Delta^{5(10)}$-gonene-17β-ol-3-one has a clearly enhanced progestomimetic action on oral administration.

(b) Determination of the estrogenic effect (Allen-Doisy test).—Comparative activity according to the Allen-Doisy test for estrogenic activity on both oral administration and subcutaneous injection was determined between 17α - ethynyl-13β-n-propyl-$\Delta^{5(10)}$-gonene-17β-ol-3-one and both 17α-ethynyl estradiol and 17α-ethynyl-$\Delta^{5(10)}$-estrene-17β-ol-3-one.

On oral administration of the three compounds, the following ratio of estrogenic activities was observed:

Table III.—Estrogenic activity—Allen-Doisy test—
Oral administration

| | Activity ratio |
|---|---|
| 17α-ethynyl-estradiol | 1 |
| 17α-ethynyl-$\Delta^{5(10)}$-estrene-17β-ol-3-one | 1/30 |
| 17α - ethynyl - 13β-n-propyl-$\Delta^{5(10)}$-gonene-17β-ol-3-one | 1/30 |

On subcutaneous injection of the three compounds, the following ratio of estrogenic activities was observed:

Table IV.—Estrogenic activity—Allen-Doisy test—
Subcutaneously

| | Activity ratio |
|---|---|
| 17α-ethynyl-estradiol | 1 |
| 17α-ethynyl-$\Delta^{5(10)}$-estrene-17β-ol-3-one | 1/300 |
| 17α - ethynyl-13β-n-propyl-$\Delta^{5(10)}$-gonene-17β-ol-3-one | 1/30 |

17α - ethynyl - 13β-n-propyl-$\Delta^{5(10)}$-gonene-17β-ol-3-one has a marked diminution of estrogenic effect as determined by the Allen-Doisy test comparable to that of 17α-ethnyl-$\Delta^{5(10)}$-estrene-17β-ol-3-one, as compared with 17α-ethynyl-stradiol.

Test of the weight of the uterus

Comparative activity according to the weight of the test of the uterus for estrogenic activity on both oral administration and subcutaneous injection was determined between 17α - ethynyl-13β-n-propyl-$\Delta^{5(10)}$-gonene-17β-ol-3-one and both 17α-ethynyl-estradiol and 17α-ethynyl-$\Delta^{5(10)}$-estrene-17β-ol-3-one.

On oral administration of the three compounds, the following ratio of estrogenic activities was observed:

Table V.—Estrogenic activity—Test of weight of the uterus—Orally

| | Activity ratio |
|---|---|
| 17α-ethynyl-estradiol | 1 |
| 17α-ethynyl-$\Delta^{5(10)}$-estrene-17β-ol-3-one | 1/40 |
| 17α-ethynyl-13β-n-propyl-$\Delta^{5(10)}$-gonene - 17β-ol-3-one | 1/1800 |

On subcutaneous injection of the three compounds, the following ratio of estrogenic activities was observed:

Table VI.—Estrogenic activity—Test of weight of the uterus—Subcutaneously

| | Activity ratio |
|---|---|
| 17α-ethynyl-estradiol | 1 |
| 17α-ethynyl-$\Delta^{5(10)}$-estrene-17β-ol-3-one | 1/200 |
| 17α-ethynyl-13β-n-propyl-$\Delta^{5(10)}$-gonene - 17β-ol-3-one | 1/3500 |

17α-ethynyl-13β-n-propyl-$\Delta^{5(10)}$-gonene-17β - ol - 3-one has a practically non-existent estrogenic activity as determined by the test of the weight of the uterus. In comparison with 17α-ethynyl-estradiol which has an international rat unit of about 1γ, a dose of 1800 to 3500 times larger (or 36 mg./kg. to 70 mg./kg.), depending on the mode of administration, of 17α-ethynyl-13β-n-propyl-$\Delta^{5(10)}$-gonene-17β-ol-3-one is required for comparable activity. Similarly in comparison with 17α-ethynyl-$\Delta^{5(10)}$-estrene-17β-ol-3-one, a dose of 17.5 to 45 times larger, depending on the mode of administration of 17α-ethynyl-13β-n-propyl-$\Delta^{5(10)}$-gonene-17β-ol-3-one is required for comparable activity.

(c) Study of the retarding action on hypophysis.—The retarding action on hypophysis of 17α-ethynyl-13β-n-propyl-$\Delta^{5(10)}$-gonene-17β-ol-3-one (I, R=H) was evaluated on castrated female rats united parabiotically with entire rats.

The parabios test enables a quantitative appraisal of the increase of hypophysial gonadotropic activity of the castrated subject by measuring the weight of ovaries of the intact partner. This hypertrophy of gonades after castration can be inhibited by androgenic or estrogenic sexual hormones, but with all the inconveniences that comprise their hormonal activity. The present compounds are practically devoid of the latter type of activity.

The technique of the parabios test is the following: 30-day old female rats of the same litter are united in parabiotic union according to the method described by Bunster et al. (Anat. Rec., 1933, 57, 339). One of the pair was castrated and treated the same day with 17α-ethynyl-13β-n-propyl-Δ5(10)-gonene-17β-ol-3-one. The animals received the medicine for a period of 10 days.

The animals were sacrificed the eleventh day after the parabiotic union. The genital organs were separated and weighed. It is known in effect that castration causes a hypersecretion of hypophysial gonadotropic hormones which causes in animals united in parabiotic union, an increase in weight of the ovaries and the uterus of the entire rat by folliculinic stimulation.

In this test, 17α-ethynyl-13β-n-propyl-Δ5(10)-gonene-17β-ol-3-one was administered for a period of 10 days orally at up to a dose of 200γ in such a fashion as to find out the threshold dose provoking total hypophysial inhibition.

The results obtained are resumed in Table VII below. These comparative tests were effected simultaneously by the administration under the same conditions of 17α-ethynyl-Δ5(10)-estrene-17β-ol-3-one at doses of 150γ and 200γ per day.

limited to the above specific embodiments. Other expedients known to those skilled in the art may be employed without departing from the spirit of the invention and the scope of the appended claims.

We claim:

1. The process of obtaining a progestomimetic response and practically non-existent estrogenic activity in warm-blooded animals which comprises orally administering from about 1 mg./kg. to about 15 mg./kg. per day of a gonene compound of the formula

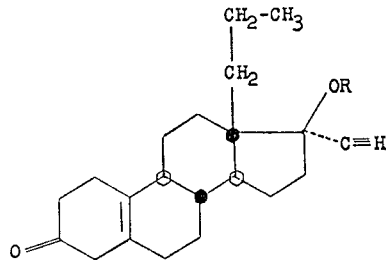

wherein R is a member selected from the group consisting of hydrogen and the acyl radical of an organic carboxylic acid having from 1 to 18 carbon atoms.

2. The process of obtaining a progestomimetic response

TABLE VII

| Treatment | Dose administered, γ | Average weight of the uterus of the castrated rats | Average weight of the uterus of the entire rats in | Average weight of the ovaries of the entire rats in | Hypophysial inhibition in percent |
|---|---|---|---|---|---|
| | | in mg. | mg. | mg. | |
| Control | 0 | 32 | 137 | 168 | |
| 17α-ethynyl-Δ5(10)-estrene-17β-ol-3-one | 200 | 133 | 132 | 27.7 | 92.9 |
| | 150 | 136 | 131 | 19 | 100 |
| 17α-ethynyl-13β-n-propyl-Δ5(10)-gonene-17β-ol-3-one | 200 | 60 | Inhibition plateauing at 50% to 75% of the cases | | |

17α-ethynyl-13β-n-propyl-Δ5(10)-gonene-17β-ol-3-one causes between 50% to 75% inhibition against oversecretion of the F.S.H. factor. Increasing dosage levels do not effect a further increase in this level of inhibition.

(d) Androgenic and anabolic action.—Comparable to 17α-ethynyl-Δ5(10)-estrene-17β-ol-3-one, the compound of the invention, 17α-ethynyl-13β-n-propyl - Δ5(10)-gonene-17β-ol-3-one was practically completely devoid of androgenic and anabolic action at comparable standard doses.

17α-ethynyl-13β-n-propyl-Δ5(10)-gonene-17β - ol - 3-one is thus effective as an oral progestomimetic agent while having only a weak hypophysial inhibitory action and a practically non-existent estrogenic, androgenic and anabolic action. It is thus effective as an oral progestomimetic without adverse side effects.

It is to be understood that the invention is not to be and practically non-existent estrogenic activity in warm-blooded animals which comprises orally administering from about 1 mg./kg. to about 15 mg./kg. per day of 17α-ethynyl-13β-n-propyl-Δ5(10)-gonene-17β-ol-3-one.

References Cited

UNITED STATES PATENTS 2,725,389  11/1955  Colton _____ 260—397.4
2,830,063  4/1958   Clinton et al. _____ 260—397.5
3,062,713  11/1962  Ruggieri et al. _____ 167—53
3,075,970  1/1963   Nomine et al. _____ 260—239.55

OTHER REFERENCES

Fried et al.: J.A.C.S., 83, p. 4663–64 (1961).

H. A. FRENCH, *Primary Examiner.*

UNITED STATES PATENT OFFICE
CERTIFICATE OF CORRECTION

Patent No. 3,407,255                    Dated  October 22, 1968

Inventor(s)    Robert Joly et al.

It is certified that error appears in the above-identified patent and that said Letters Patent are hereby corrected as shown below:

Column 1, line 8

French Priority Applications PV 895,563 dated April 25, 1!

and                          PV 905,184 dated July 26, 19( were not indicated in the patent Signed and sealed this 30th day of May 1972.

(SEAL)
Attest:

EDWARD M. FLETCHER, JR.                ROBERT GOTTSCHALK
Attesting Officer                      Commissioner of Patents